UNITED STATES PATENT OFFICE.

HENRY F. CAMPBELL, OF MELROSE, MASSACHUSETTS.

PROCESS OF CONCENTRATING ORE.

SPECIFICATION forming part of Letters Patent No. 723,363, dated March 24, 1903.

Application filed February 18, 1903. Serial No. 144,001. (No specimens.)

*To all whom it may concern:*

Be it known that I, HENRY F. CAMPBELL, a citizen of the United States, residing at Melrose, in the county of Middlesex and State of Massachusetts, have invented a certain new and useful Process of Concentrating Ore, of which the following is a specification.

My invention relates to the preparation of pyritiferous and other ores for treatment by a magnetic machine or process and the concentration of the same by magnetic separation of the valuable constituents from the waste.

It consists in heating the ore to the extent and in the manner hereinafter described.

My process is adapted for the treatment of a great variety of mineral ores and deposits containing iron in any of its combinations, physical or chemical. It is especially valuable in the treatment of such ores as contain, among other constituents, iron sulfids carrying gold or silver, zinc-blendes, or copper pyrites. All ferruginous ores can be rendered more valuable, and large bodies of mineral ores and deposits that have not hitherto been worth the working can be made profitable by the use of my process.

Many attempts have been made to concentrate ores by magnetic separation and to prepare them therefor, and machines and processes have been devised for those purposes, some of which have been patented; but the practical results of these efforts have been unsatisfactory. In all instances the treatment adapted to render the iron susceptible to the influence of magnetic attraction greatly impaired or destroyed the commercial value of the zinc sulfids contained in the ore and also rendered the zinc sulfids, silicates, and other so-called "non-magnetic" materials in the ore sensitive to the influence of a magnetic field and prevented a satisfactory separation of the iron pyrites from them. Furthermore, the roasting process to which the ore was subjected required a long time, and careful observation was necessary to determine when the ore was ready for removal from the furnace and to prevent it from oxidizing and fusing.

Heretofore it has been supposed that in order to render an iron sulfid magnetic a considerable quantity of the sulfur must be removed, at least about one-half or what is known as the "first atom," thus reducing the pyrite to nearly or quite a pyrrhotite. To accomplish this reduction, it is necessary to heat or roast the ore for a considerable period of time. The degree and duration of heat which is necessary to eliminate approximately one-half of the sulfur of the iron sulfids in ferruginous ores containing zinc sulfid also compels the latter to part with so large a percentage of its sulfur that its commercial value is greatly impaired or destroyed.

There are many large deposits of iron and zinc sulfids that prior to my invention could not be profitably worked; but now by the employment of my invention the iron in combination can be commercially removed from the ore and the zinc sulfid left unimpaired for smelting and commercial purposes. In zinciferous ores bearing lead the lead may be removed by water concentration in the usual way, either before or after the treatment by my process.

My process is also valuable in the treatment of ferruginous manganese ores. I have found that by a brief heating in many cases the greater part of the iron may be removed from the manganese. I further find that by a more prolonged heating I am able to remove both the iron and manganese from the silica and other constituents.

Prior to my invention it was unknown that the action of heat upon ore containing zinc sulfids, silicates, and other non-magnetic materials was such as to cause the non-magnetic materials to be removed from the ore by magnetic attraction in the process of magnetic separation owing to magnetic sensibility being imparted by heat to such materials or to infinitesimal particles of some paramagnetic material with which they are associated; but I have discovered this to be the fact. In former methods of treating ores to render them magnetic by the action of heat the degree and duration of heat employed was such, under the mistaken belief that a large part of the sulfur must be removed to render the iron sulfid magnetic, that large quantities of non-magnetic and waste constituents of the ore were rendered susceptible to removal from the mass by magnetic force. I have discovered that iron pyrites can be rendered magnetic by the action of heat without the removal of an appreciable amount of sulfur and that the magnetic effect is chiefly due to the direct action of the heat upon the iron pyrites and not that it is caused by the removal of the sulfur. The removal of the sulfur in the prior methods of treating ore by roasting to render it magnetic was an incident of the prolonged exposure to heat, but was not necessary to magnetize the iron pyrites, as it has been erroneously supposed. I find that if iron pyrites are subjected to the action of heat for the brief space of one minute, or even less, they are rendered magnetic, and that it is not always necessary to heat the ore to redness in order to suitably prepare it for separation by a magnetic machine or process. If less than a red heat is employed, a longer exposure is required. The degree of heat must be considered in determining the length of exposure of the ore thereto. The degree of heat and length of exposure should be adequate only to magnetize the iron without sensitizing the zinc, silicates, or other non-magnetic materials and without removing an appreciable amount of sulfur. Different ores of this character vary somewhat in the requirements to render them sufficiently magnetic for the best results in the separating process; but exposure to red heat for five minutes or less is all that is required for the most refractory ores to give the best results. Less than five minutes' exposure to red heat in an ordinary rotary furnace under the usually-prevailing conditions renders the majority of ores sufficiently magnetic to prepare them for commercial separation. This is not attended with the removal of sufficient sulfur to impair the commercial value of the zinc sulfids.

I have discovered that in the magnetic separation of ores containing zinc, silicates, and other waste materials if subjected to a high degree and long duration of heat, such as has been heretofore the practice, a large amount of the zinc, silicates, and waste will be lifted out by the magnets and mingled with the concentrates by reason of the prolonged heat imparting magnetic sensibility to such materials or to infinitesimal particles of some paramagnetic matter with which they are associated. I have discovered that when these materials are subjected to a brief red heat of but a few minutes, which is sufficient to magnetize the iron, they are not affected so as to be lifted out of the mass of ore by the magnets. My discoveries enable me to treat ores containing non-magnetic iron and copper pyrites combined with zinc sulfids, silicates, and other waste materials, so as to remove all the iron from the mass that can be profitably taken out by magnetic attraction, and to exclude essentially all the zinc, silicates, and other waste materials. In working zinciferous ores I am thereby enabled to get a valuable zinc product, removing practically all the iron, and to get a valuable concentrate in the product lifted out by the magnets.

In the practice of my invention the ore is first pulverized or comminuted from twenty to thirty mesh and then charged into any of the well-known furnaces for roasting ore and subjected to heat under the usually-prevailing conditions. I prefer to use a cylindrical rotary furnace having the fire-box at one end and receiving the ore at the other, similar to the White Howell pattern, for the purpose of agitating the ore and heating it uniformly at the same time. It is desirable in some instances to give the furnace a sharp pitch or angle of inclination, so that the ore will feed or drop quickly through it, and to construct the interior of the furnace without the partitions or septums which are ordinarily employed, so as to avoid obstructions to the free passage of the ore. The ore in passing through the furnace is exposed to heat for a predetermined length of time. This is ascertained by heating several sample lots or specimens of a given ore to a red heat for different periods of time, ranging from a few seconds to five minutes, and then subjecting them to the action of a magnetic separator and assaying the products for the purpose of determining which specimen affords the best results with respect to the purity of concentrate produced—that is to say, I submit a specimen of crushed or pulverized ore to a quick blast of red heat by passing it through the furnace as rapidly as possible, occupying but a few seconds of time, and then running it through the magnetic separating-machine and assaying the products. This brief action of heat will magnetize the iron pyrites to some extent in any ore and sufficiently in some ores so that all the iron pyrites, together with the gold, silver, and copper with which it is combined, will be removed from the mass by the magnetic separator without removing any appreciable amount of the silicious and non-magnetic materials. The products are then assayed, and if found that all the iron pyrites are not removed from the mass I subject another specimen of the ore to the action of the furnace at the same heat for a slightly-longer time and in turn run it through the magnetic separator and assay the products, as before. This operation is repeated on different specimens of a given ore until the length of time is ascertained which is required for heating the ore to enable the separating-machine to remove the largest percentage of the iron pyrites essentially free from silicious and other waste materials. I find that after an exposure of any ore to red heat for a period of five minutes or less, generally not more than three minutes, practically all the iron pyrites will be removed by the magnetic separating process and that no appreciable amount of sulfur will be removed from the zinc-blende contained in the ore, and the silicates and other materials that become sensitized to the magnet by prolonged heating are not affected by the influence of the magnetic field.

For the purpose of illustrating I take a sample of ore which contains, say, thirty-four per cent. of iron pyrites bearing gold or silver, thirty-eight per cent. of zinc sulfid, and twenty-eight per cent. of lead, silicates, and waste materials. I pulverize it to twenty mesh and subject it to a barely-perceptible red heat for thirty seconds. Then I cool it speedily and run it through a magnetic separating-machine. The products are assayed, and if, say, from thirty to thirty-three per cent. of the ore removed by the magnetic action is iron pyrites bearing gold or silver essentially free from silicates and other non-magnetics and the residue of the ore shows but a small trace of iron pyrites the operation is regarded as successful, and the bulk of the ore is subjected to the same heat for the same time. If a substantial portion of the iron pyrites remains with the silicates and non-magnetics, I subject the ore to the same degree of heat for a slightly-longer time and repeat the operation of magnetic separating and assaying the products until the desired separation is attained. It may be necessary to make several tests for different lengths of time, not exceeding five minutes to attain the best results. It will be found as a result of all tests that the zinc sulfid will have parted with scarcely any of its sulfur, not enough to impair at all its commercial value. If the products of any test should reveal a considerable quantity of zinc, silicates, or other so-called "non-magnetics," mingled with the iron pyrites removed by the magnets, the ore should of course be subjected to heat for a less period of time.

By an intelligent use of my process in treating pyritiferous ore a practically perfect separation of the iron pyrites from the other constituents can be attained, and where zinc-blende is present it will retain, essentially, all its sulfur and not be impaired for smelting and commercial purposes. Having ascertained the length of time and degree of heat required to attain the best results with a given ore, the revolving speed of the furnace and its angle of inclination are adjusted to cause the ore to pass through it in that space of time and the furnace is fired to the requisite degree of heat. It is impracticable to adjust the speed and inclination of the furnace so as to fix absolutely the time of passage of the ore through it, but it can be approximately done and sufficiently so for all practical purposes. No other test than I have described is required to determine when the ore should be discharged from the furnace. No examination of the ore is needed during the heating process, and no care is required to prevent oxidizing or fusing of the materials, as heretofore, because the exposure to heat in my process is never sufficient in case of the most refractory ore to incur any danger of these evils. When the ore is discharged from the furnace, it is quickly cooled, preferably by artificial means. The time consumed in cooling the ore must be taken into consideration in estimating the duration of time to which it is exposed to heat. If it is allowed to cool slowly, it is of course thereby exposed to heat for a longer period of time than when cooled quickly. After cooling the ore it is passed through a magnetic separating-machine, the one preferred being the so-called "Campbell" machine invented by me.

I desire to emphasize the marked distinction between my process and the old methods, which resides in the brief subjection to heat. In practicing my process I retain substantially all the sulfur in the ore, while in the former methods it was customary to eliminate a substantial portion of sulfur without fusing the particles of ore. It was a delicate process to follow the operation so closely as to attain this result. Experience and skill were required to do it. In properly practicing my invention it is impossible to fuse the particles of ore in that degree and duration of heat required to treat the most refractory ore. No attention whatever is required in that respect. The length of time the ore is to remain in or occupy in passing through the furnace is predetermined, and when the time expires it is discharged from the furnace, having required no inspection or test during the heating process. If the ore treated contain iron and zinc sulfids, the iron is removed by magnetic attraction and delivered into one receptacle and the zinc sulfid and waste materials are discharged into another. The zinc sulfid has parted with no appreciable amount of sulfur and is unimpaired for smelting purposes. If the zinciferous ore contains gold, silver, or copper, nearly all the gold and copper and a large percentage of the silver are removed with the iron pyrites, and the expense of smelting the same is greatly reduced by reason of the absence of zinc. If the ore consists of iron pyrites bearing values combined with silicious and other waste materials, the iron and nearly all the valuable constituents are removed without carrying with them any appreciable portion of the waste, thus saving the cost of transportation of the waste and rendering the valuable portions of the ore less expensive to treat at the smelter, for not only is it an expense to handle the waste materials at the smelter, but an additional charge is made or penalty imposed for smelting concentrates in proportion to the percentage of waste which they contain. There are some ores in which the silicates are so sensitive that essentially all cannot be excluded from the iron; but in these instances a large percentage can be excluded by my process that would otherwise be removed with the iron. In an ore carrying only iron pyrites and silicious and other waste materials the pyrites may be separated with but slight loss of sulfur, thus rendering them more available for the manufacture of sulfuric acid or metallic sulfur.

The advantages of my process over former methods in addition to making a better separation of the valuable portion of the ore from the waste materials and not impairing the commercial value of some of the constituents consist in a saving of fuel and time, less skill in conducting the work, and in avoiding dust during the separating process.

The gist of my invention resides in the discoveries that non-magnetic iron sulfids in mineral ores may be rendered magnetic by heat without removing the sulfur from the ore to any material extent; that the silicious and other non-magnetic materials of the ore are sensitized or made susceptible to the influence of a magnetic field by heating or roasting the ore to the extent employed in earlier experiments of reducing it essentially to a pyrrhotite and are not materially sensitized by the degree and duration of heat which I have discovered are sufficient to magnetize the iron pyrites.

My invention is not limited to the use of any particular construction of furnace or means of magnetic separating or method of determining the length of time to subject the ore to heat. Various forms of furnaces, different means of magnetic separating and methods of determining the degree and duration of heat for a given ore may be employed in practicing my invention than those described and would be within the scope thereof.

Although I have designated as "magnetic" the electrical effect employed by me as the means for separating the ore, any electrical or polarizing influence that may be utilized for diverting the constituents of the ore into different channels when used in conjunction with my described process of preparing the ore therefor is comprehended by my invention and is to be understood as included within the means for separating the ore wherever and in whatever terms they are mentioned herein.

What I claim, and desire to secure by Letters Patent, is—

1. The hereinbefore-described process of concentrating ferruginous ores containing sulfids, which consists in heating the material for a brief time sufficiently to render portions thereof responsive to electrical influences without the removal of a substantial amount of any constituent other than water, and subjecting the material to such influences for the removal of the portions of the material rendered responsive.

2. The hereinbefore-described process of concentrating ferruginous ore containing silicious or other waste materials, which consists in heating the same for a brief time sufficiently to render portions thereof responsive to electrical influences without the removal of a substantial amount of any constituent other than water, and then subjecting the material to such influences for the removal of the portions of the material rendered responsive, and leaving in the residue substantial quantities of silicious or other waste materials susceptible of being removed by such influences upon greater exposure to heat.

3. The hereinbefore-described process of concentrating ferruginous ore containing zinc sulfids or other non-magnetic values, which consists in subjecting the same to the action of heat for a brief time sufficient to magnetize the principal iron constituents of the ore, but insufficient to cause the removal of a substantial amount of the constituents of the ore other than water, then magnetically removing the said iron constituents and leaving in the residue substantial quantities of zinc sulfids or other non-magnetic values susceptible of being magnetically removed from the ore upon greater exposure to heat.

4. The hereinbefore-described process of concentrating ferruginous ore containing silicious or other waste materials which consists in subjecting the same to the action of heat for a brief time sufficient to magnetize the principal iron constituents of the ore but insufficient to cause the removal of a substantial amount of the constituents of the ore other than water, then magnetically removing the said iron constituents and leaving in the residue substantial quantities of silicious or other waste materials susceptible of being magnetically removed from the ore upon greater exposure to heat.

5. The hereinbefore-described process of concentrating pyritiferous ore which consists in subjecting the same to sufficient heat to magnetize the iron pyrites for a period of time insufficient to drive off any substantial amount of sulfur and then magnetically separating the pyrites from the mass, while they retain practically all the original quantity of sulfur.

6. The hereinbefore-described process of concentrating pyritiferous ore containing zinc sulfids or other non-magnetic values, which consists in subjecting the same to sufficient heat to magnetize the pyrites for a period of time insufficient to drive off any substantial amount of sulfur and then magnetically separating the pyrites from the mass while they retain practically all the original quantity of sulfur and leaving in the residue substantial quantities of zinc sulfids or other non-magnetic values susceptible of being magnetically removed from the ore upon greater exposure to heat.

7. The hereinbefore-described process of concentrating pyritiferous ore containing silicious or other waste materials, which consists in subjecting the same to sufficient heat to magnetize the pyrites for a period of time insufficient to drive off any substantial amount of sulfur, and then magnetically separating the pyrites from the mass, while they retain practically all the original quantity of sulfur, and leaving in the residue substantial quantities of silicious or other waste materials susceptible of being magnetically removed from the ore upon greater exposure to heat.

8. The process of concentrating ferruginous ore which consists in subjecting the same to the action of red heat for a period not exceeding five minutes, and then magnetically separating the iron constituents from the ore.

9. The process of concentrating pyritiferous oré containing zinc sulfids or other non-magnetic values, which consists in subjecting the same to the action of red heat for a period not exceeding five minutes, and then magnetically separating the pyrites from the mass and leaving substantial quantities of zinc sulfids or other non-magnetic values in the residue, susceptible of being magnetically removed from the ore upon greater exposure to heat.

10. The process of concentrating pyritiferous ore containing silicious or other waste materials, which consists in subjecting the same to the action of red heat for a period not exceeding five minutes, and then magnetically separating the pyrites from the mass and leaving substantial quantities of silicious or other waste materials in the residue, susceptible of being magnetically removed from the ore upon greater exposure to heat.

11. The process of concentrating pyritiferous ore containing zinc sulfids or other non-magnetic values, which consists in subjecting the same to the action of red heat for a period not exceeding five minutes, and then magnetically separating the pyrites from the mass and leaving substantial quantities of zinc sulfids, silicious and other waste materials in the residue, susceptible of being magnetically removed from the ore upon greater exposure to heat.

In testimony whereof I hereunto set my hand this 6th day of February, A. D. 1903.

HENRY F. CAMPBELL.

Witnesses:
CHAS. F. PERKINS,
A. G. SULLIVAN.